United States Patent
Iwaya

(10) Patent No.: US 11,794,906 B2
(45) Date of Patent: Oct. 24, 2023

(54) CONTAINER FOR FLIGHT CRAFT

(71) Applicant: Iwaya Giken Inc., Sapporo (JP)

(72) Inventor: Keisuke Iwaya, Sapporo (JP)

(73) Assignee: Iwaya Giken Inc.

( * ) Notice: Subject to any disclaimer, the term of this patent is extended or adjusted under 35 U.S.C. 154(b) by 0 days.

(21) Appl. No.: 17/680,378

(22) Filed: Feb. 25, 2022

(65) Prior Publication Data
US 2022/0340251 A1    Oct. 27, 2022

(30) Foreign Application Priority Data

Mar. 19, 2021  (JP) ................................ 2021-046076
Sep. 21, 2021  (JP) ................................ 2021-153604

(51) Int. Cl.
*B64D 13/08*    (2006.01)
*G03B 17/55*    (2021.01)
*B64B 1/22*     (2006.01)

(52) U.S. Cl.
CPC .............. *B64D 13/08* (2013.01); *B64B 1/22* (2013.01); *G03B 17/55* (2013.01)

(58) Field of Classification Search
CPC . B64D 13/08; B64B 1/22; G03B 17/55; F24F 5/0021; B01L 2300/1855; Y02E 60/14
See application file for complete search history.

(56) References Cited

U.S. PATENT DOCUMENTS

| | | | |
|---|---|---|---|
| 5,363,670 A | * | 11/1994 | Bartilucci ............. F25D 29/001 62/166 |
| 9,095,120 B1 | * | 8/2015 | Skaggs ................ A01K 1/0245 |
| 2013/0242113 A1 | | 9/2013 | Tanaka |

(Continued)

FOREIGN PATENT DOCUMENTS

| JP | S49-044491 A | 4/1974 |
|---|---|---|
| JP | H09-043723 A | 2/1997 |

(Continued)

OTHER PUBLICATIONS

Japanese Office Action for corresponding Japanese Patent Application No. 2021-046076 dated Apr. 20, 2021 including English translation (15 pgs).

(Continued)

*Primary Examiner* — Ana M Vazquez
(74) *Attorney, Agent, or Firm* — Harness, Dickey & Pierce, P.L.C.

(57) ABSTRACT

Container 12 is a cabin of a gas balloon, Container 12 has Main Body 121, which is an airtight container for accommodating Crew Member H1 and is filled with Air 122, Heat Transfer Member 125 made of a material that has a high thermal conductivity such as aluminum and that covers the inside of Main Body 121 and is partially in contact with Heat Absorber Holder 123, Heat Absorber Holder 123 that is a container made of a material that has a high thermal conductivity, such as aluminum, and is located outside of Main Body 121, and Heat Absorber 124 contained in Heat Absorber Holder 123. Heat generated by Crew Member H1 is transferred via Air 122 to Heat Transfer Member 125 and then to Heat Absorber Holder 123. Heat Absorber 124 absorbs heat from Heat Absorber Holder 123 as heat of vaporization and changes from a liquid to a gas.

6 Claims, 3 Drawing Sheets

(56) References Cited

U.S. PATENT DOCUMENTS

| | | |
|---|---|---|
| 2014/0093757 A1 | 4/2014 | Sakai et al. |
| 2015/0251761 A1* | 9/2015 | Vandyke ............... A47B 31/02 62/388 |
| 2021/0225028 A1 | 7/2021 | Konagai et al. |

FOREIGN PATENT DOCUMENTS

| | | |
|---|---|---|
| JP | H11-317442 A | 11/1999 |
| JP | 2003-255456 A | 9/2003 |
| JP | 2005-113011 A | 4/2005 |
| JP | 2005-121339 A | 5/2005 |
| JP | 2005-178896 A | 7/2005 |
| JP | 2007-274288 A | 10/2007 |
| JP | 2010-251677 A | 11/2010 |
| JP | 2011-049623 A | 3/2011 |
| JP | 2012-028974 A | 2/2012 |
| JP | 2013-190756 A | 9/2013 |
| JP | 2014-115432 A | 6/2014 |
| JP | 2014-227116 A | 12/2014 |
| JP | 2017-028039 A | 2/2017 |
| JP | 2017-119528 A | 7/2017 |
| JP | 2018-080872 A | 5/2018 |
| JP | 2019-162929 A | 9/2019 |
| JP | 2019-200081 A | 11/2019 |
| JP | 2020-097345 A | 6/2020 |
| JP | 6932408 B1 | 9/2021 |
| WO | 2013-002359 A1 | 1/2013 |

OTHER PUBLICATIONS

Japanese Office Action for corresponding Japanese Patent Application No. 2021-046076 dated Sep. 7, 2021 including English translation (13 pgs).

Japanese Office Action for corresponding Japanese Patent Application No. 2021-046076 dated May 24, 2022 including English translation (7 pgs).

"Galaxy S II finally to "space" Samsung's "Space Balloon project" starts on Jul. 15", Yoichi Hiraga, ITmedia, online Jul. 14, 2011 (8 pages).

"Nagoya University team starts crowdfunding with VR for spherical images of the universe", NAFT Official Website; http://naft.space/ VR Video, Jan. 10, 2017 (5 pages).

"Funassyi holds a live concert in space", online, Dec. 12, 2014 (23 pages).

Office Action issued in the corresponding Chinese Patent Application No. 202210181116.4; dated Dec. 30, 2022 (total 8 pages).

* cited by examiner

CONTAINER FOR FLIGHT CRAFT

TECHNICAL FIELD

This invention relates to a container for use with a flying object such as a balloon and an airship.

BACKGROUND ART

Known in the art are flying objects such as balloons and airships provided with cabins that act as containers for accommodating humans (crew members). By use of such flying objects humans can be transported through air.

Patent Document 1 discloses a flying object equipped with a cabin for accommodating a crew member. Patent Document 1 proposes a manned drone equipped with a main body that accommodates a crew member and is suspended for flight by one or more balloons.

PRIOR ART DOCUMENT

Patent Document

Patent Document 1: JP2020-97345A

SUMMARY OF THE INVENTION

Problem to be Solved by the Invention

In a cabin of a flying object that flies at a relatively low altitude, for example, at an altitude of less than 10,000 meters from the ground, heat generated in the cabin can be easily discharged to the exterior of the cabin through ventilation. Thus, a temperature in the cabin can be maintained within a range that is comfortable for a crew member.

Flying objects such as gas balloons are able to ascend from ground level up to altitudes in excess of 50,000 meters. At such high altitudes near-vacuum space is approached. For flight at such high altitudes, it is necessary to use a cabin structure that keeps an interior of the cabin airtight and prevents leakage of air from inside the cabin to the exterior of the cabin. Under such conditions, it is not possible to utilize ventilation. Moreover, at flight altitudes close to near-vacuum space, minimal air comes into contact with an exterior of the cabin and thus convection cooling of the cabin effectively does not occur.

In view of the foregoing, in a cabin of a flying object that flies at high altitudes it is necessary to provide a mechanism that discharges heat generated inside the cabin to the exterior of the cabin to maintain a temperature inside the cabin within a desirable range.

A flying object capable of flying at high altitudes may also be equipped with an airtight container that houses a temperature-sensitive device such as a camera device. Similar to the cabin described above, such a container also requires provision of a mechanism that discharges heat generated inside the container to the exterior of the container to maintain a temperature inside the container within a desirable range, and such that heat from the device is not entirely dissipated.

In view of the above circumstances, the present invention provides a means by which heat generated in an airtight container for a flying object flying at high altitude can be discharged to the exterior of the container.

Means for Solving the Problem

The present invention includes, as a first aspect, a container for a flying object comprising: a main body that contains a heat source; a heat absorber that absorbs heat as a result of phase change of the heat absorber; a heat absorber holder that holds the heat absorber and is mounted to an outside of the main body; and a heat transfer member that transfers heat generated by the heat source to the heat absorber, either by passing through the main body or without passing through the main body.

The present invention includes, as a second aspect, a container according to the first aspect, wherein the heat transfer member includes fluid that convects in the main body.

The present invention includes, as a third aspect, a container according to the first aspect, wherein the heat transfer member includes a heat transfer portion made of a heat transfer material, the heat transfer portion being in contact with the heat source, and in contact with the main body or the heat absorber holder.

The present invention includes, as a fourth aspect, a container according to the first aspect, wherein the heat absorber holder has an opening for exhausting the heat absorber when the heat absorber absorbs heat and transforms into a gas.

The present invention includes, as a fifth aspect, a container according to the fourth aspect, comprising: a valve that controls a flow of gas moving from an inside of the heat absorber holder to an outside of the heat absorber holder through the opening.

The present invention includes, as a sixth aspect, a container according to the fifth aspect, comprising: a thermometer that measures a temperature in the main body; and a valve controller that controls opening and closing of the valve based on the temperature measured by the thermometer.

Effects of Invention

According to the present invention, even if the flying object ascends to a high altitude close to near-vacuum space, heat generated in the main body of the container of the flying object is absorbed by the heat absorber located outside the main body. As a result, a temperature inside the container is maintained within a desired temperature range.

MODES FOR CARRYING OUT THE INVENTION

Exemplary Embodiment

Figure 1:
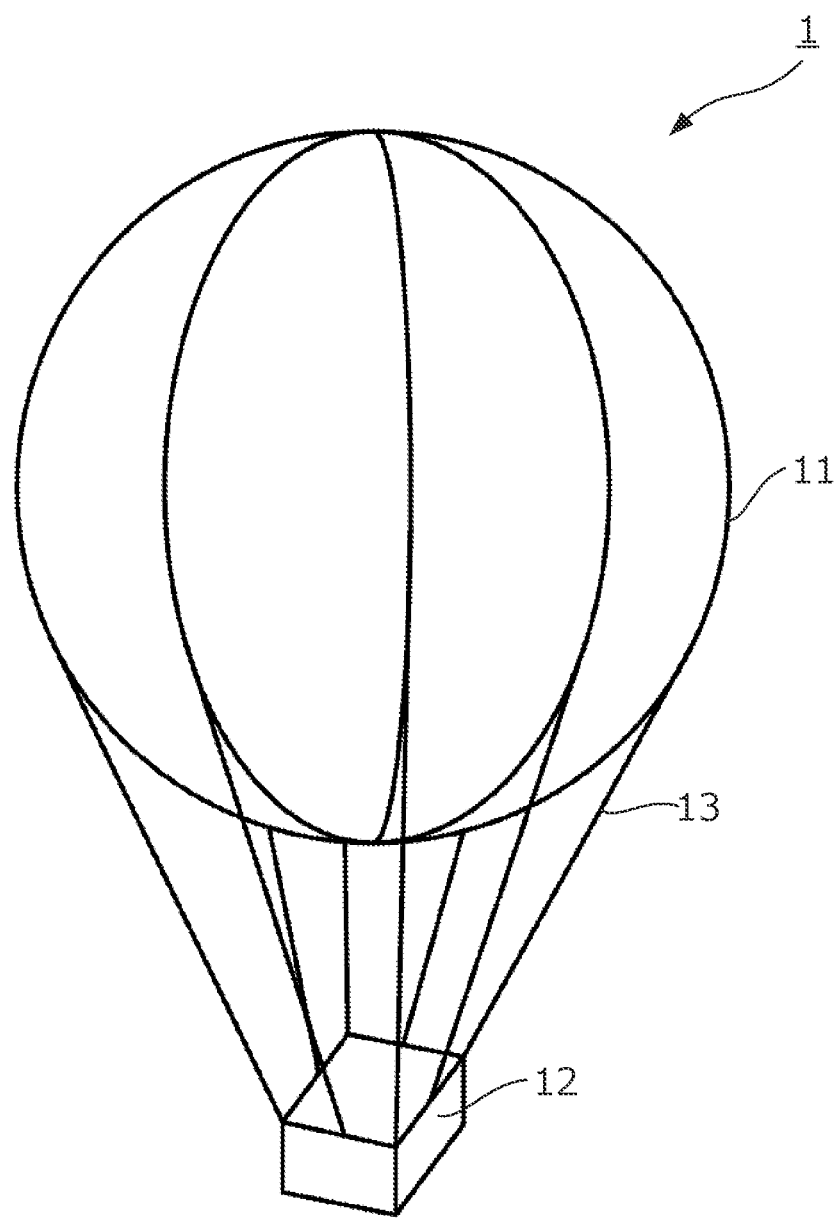
FIG. 1 shows an overall configuration of a flying object according to an exemplary embodiment of the present invention.

FIG. 1 shows an overall configuration of Flying Object 1 according to an exemplary embodiment of the present invention. Flying Object 1 comprises Envelope 11 that contains a lighter-than-air gas such as helium, and Container 12 that is suspended from Envelope 11 via Suspension Ropes 13 and moves in flight with Envelope 11. One end of each Suspension Rope 13 is connected to Envelope 11 and the other end of each Suspension Rope 13 is connected to Container 12.

Figure 2:
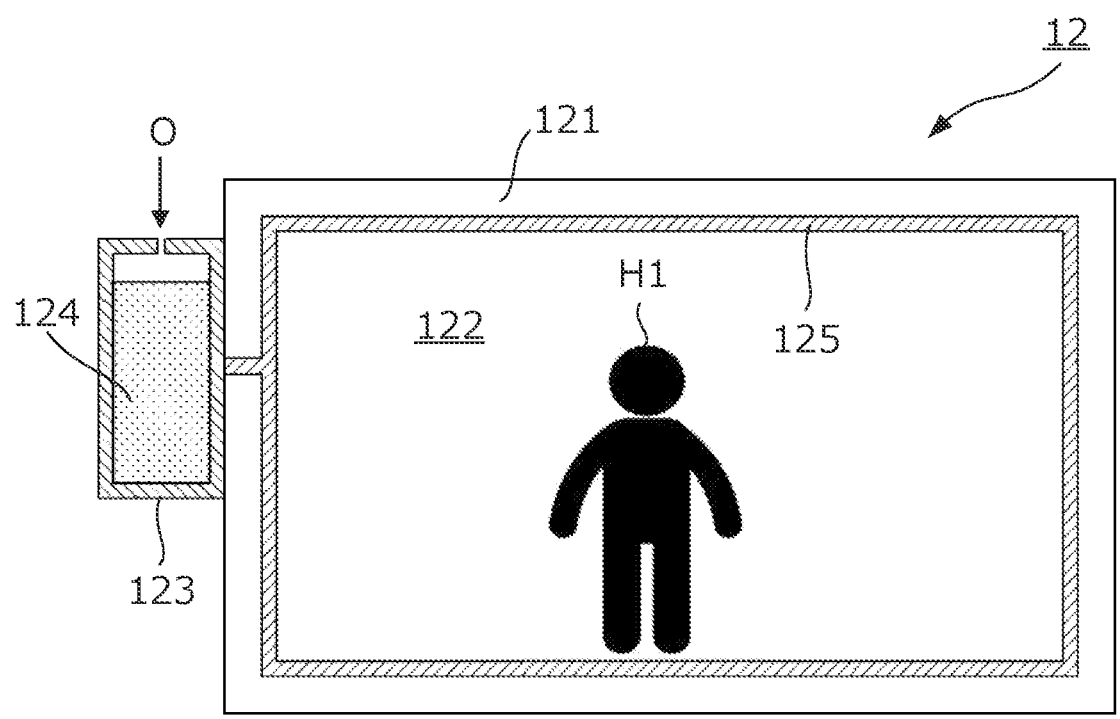
FIG. 2 shows a configuration of a container according to an exemplary embodiment of the present invention.

FIG. 2 shows a configuration of Container 12. Container 12 has Main Body 121, which is a hollow box that is filled with Air 122, and contains an object to be transported by Flying Object 1 such as Crew Member H1. Heat Absorber Holder 123, which holds Heat Absorber 124, is smaller than Main Body 121 and is mounted to the outside of Main Body 121. Heat Transfer Member 125 is arranged to cover the inside surface of Main Body 121.

Flying Object 1 is capable of ascending from ground height up to high altitudes, for example, up to tens of thousands of meters. During flight of Flying Object 1, Main Body 121 is kept airtight to maintain an interior air pressure and prevent leakage of Air 122 to the exterior. Main Body 121 is equipped with hatches and other facilities for Crew Member H1 to enter and exit prior to and after flight of Flying Object 1. These components are not shown in FIG. 2.

Main Body 121 is made of, for example, fiber-reinforced plastic. The material of Main Body 121 is not limited to fiber-reinforced plastic, but must be sufficiently strong and light weight, and may be, for example, a lightweight metal such as aluminum, a plastic that is not fiber reinforced, or a combination thereof.

Air 122 is a gas containing sufficient oxygen to enable Crew Member H1 to breathe. Main Body 121 is filled with an appropriate amount of Air 122 to maintain an air pressure in Main Body 121 at approximately atmospheric pressure.

Heat Absorber Holder 123 is a container that holds Heat Absorber 124. One or more Openings O are provided on the top surface of Heat Absorber Holder 123 to exhaust material of Heat Absorber 124 that has absorbed heat and transformed to a gas to the exterior of Heat Absorber Holder 123. Heat Absorber Holder 123 is made of a lightweight and highly thermal conductive material, for example, a lightweight metal such as aluminum.

Heat Absorber 124 is a liquid that absorbs heat and becomes a gas. Heat Absorber 124 is a liquid with a boiling point of, for example, 25 degrees Celsius under an atmospheric pressure at an altitude at which Flying Object 1 remains for a prolonged period of time during flight. In this case, when a temperature in Main Body 121 rises above 25 degrees Celsius, Heat Absorber 124 reaches its boiling point and absorbs heat as heat of vaporization, whereby a temperature in Main Body 121 is maintained at slightly above 25 degrees Celsius.

Heat Transfer Member 125 is a member that transfers heat generated by objects contained in Main Body 121 such as Crew Member H1 to Heat Absorber Holder 123. Heat Transfer Member 125 is made of a lightweight with highly thermal conductive material, for example, a lightweight metal such as aluminum. Heat Transfer Member 125 covers the inside of Main Body 121. A portion of Heat Transfer Member 125 is in contact with Heat Absorber Holder 123 via a hole that extends through Main Body 121.

Some of heat generated by heat sources in Main Body 121, such as Crew Member H1, and devices not shown in FIG. 2, is transferred to a part of Heat Transfer Member 125 in contact with the heat sources. Then, the heat is transferred to Heat Absorber Holder 123 through Heat Transfer Member 125, and is absorbed by Heat Absorber 124 as heat of vaporization.

On the other hand, some of heat generated by the heat sources in Main Body 121 is transferred to some of Air 122 in contact with the heat sources. Air 122 heated by the heat sources moves into contact with Heat Transfer Member 125 by, for example, convection. Then, heated Air 122 is transferred to Heat Absorber Holder 123 through Heat Transfer Member 125, and is absorbed by Heat Absorber 124 as heat of vaporization.

As described above, Air 122 and Heat Transfer Member 125 are examples of heat transfer members that transfer heat generated by the heat sources in Main Body 121 to Heat Absorber 124.

According to the above-described configuration of Container 12, a temperature in Main Body 121 is maintained within a desired temperature range even when Flying Object 1 flies close to near vacuum space.

[Modifications]

The above-described Flying Object 1 is an exemplary embodiment of the present invention, and may be modified in various ways. Following are examples of modifications of the above-described embodiment. Two or more of the above-described embodiment and the following modifications may be combined.

Figure 3:
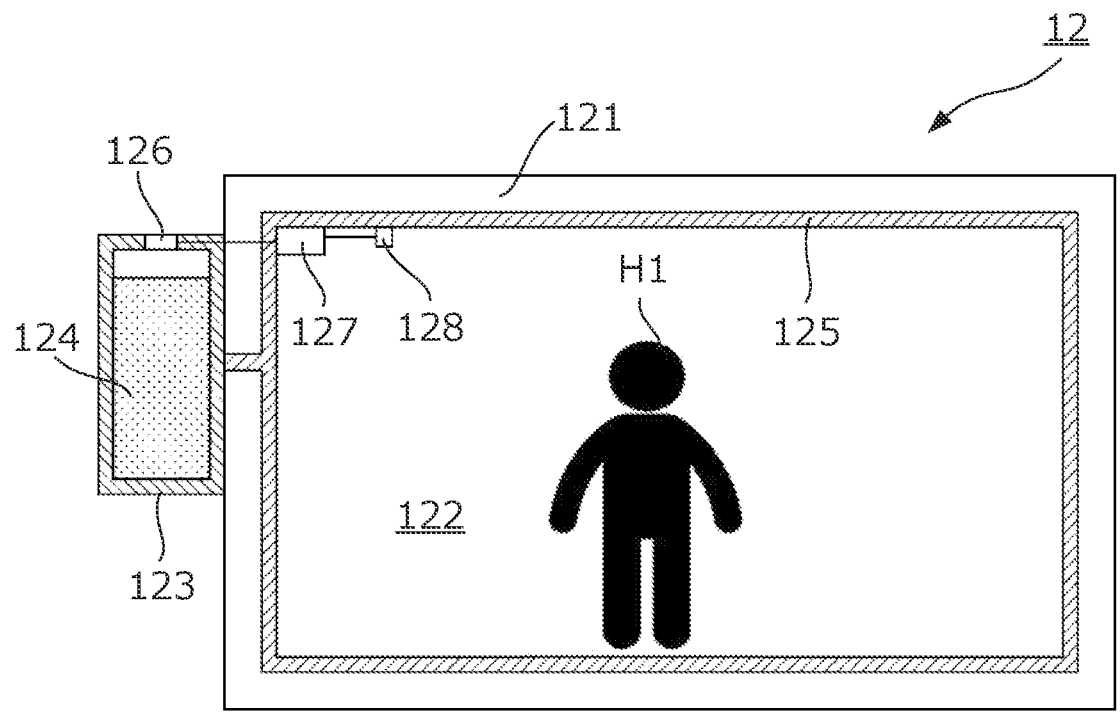
FIG. 3 shows a configuration of a container according to a modification of the exemplary embodiment of the present invention.

(1) In the Flying Object 1 of the embodiment described above, Openings O (exhaust vents) in Heat Absorber Holder 123 are always open. Alternatively, Container 12 may be equipped with one or more valves that block Openings O. The valves are used to control a flow of gas moving from the inside to the outside of Main Body 121 through Openings O FIG. 3 shows a configuration of Container 12 according to this modification. In addition to the components provided in Container 12 in the embodiment described above, in this modification Container 12 is equipped with Valve 126 positioned to block Opening O, Valve Controller 127 that controls opening and closing of Valve 126, and Thermometer 128 that measures a temperature in Main Body 121. Thermometer 128 outputs temperature data indicating a measured temperature to Valve Controller 127. Valve Controller 127 opens Valve 126 if a temperature indicated by the temperature data obtained from Thermometer 128 exceeds a predetermined upper threshold when Valve 126 is closed. Valve Controller 127 closes Valve 126 if the temperature indicated by the temperature data obtained from Thermometer 128 falls below a predetermined lower threshold when Valve 126 is open.

According to Container 12 of this modification, a temperature in Main Body 121 is maintained within a desired temperature range even if the boiling point of Heat Absorber 124 at the atmospheric pressure of the space in which Flying Object 1 is flying is not within the desired temperature range.

In this modification, Container 12 may not be equipped with Valve Controller 127 and Thermometer 128, and Valve 126 opens when a pressure difference between the inside and outside of Heat Absorber Holder 123 exceeds a predetermined lower threshold value and closes when a pressure difference between the inside and outside of Heat Absorber Holder 123 falls below a predetermined upper threshold value.

Figure 4:
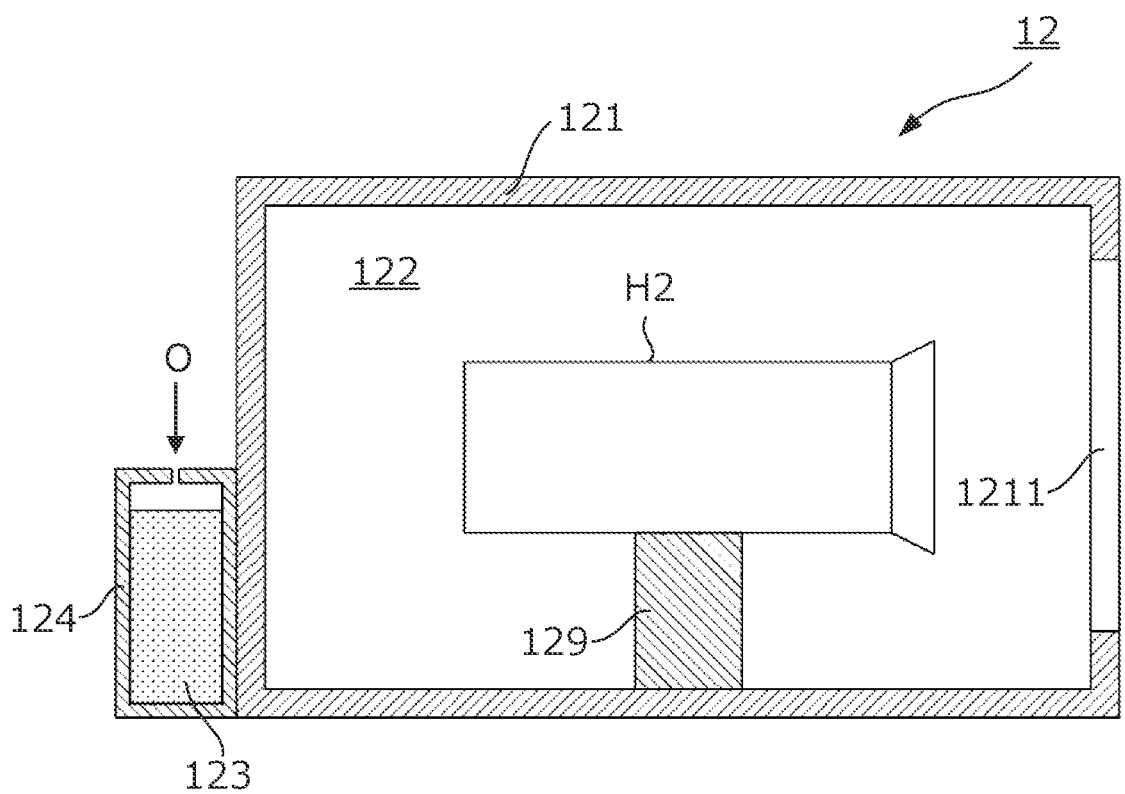
FIG. 4 shows a configuration of a container according to a modification of the exemplary embodiment of the present invention.

(2) In the embodiment described above, Main Body 121 of Container 12 is a cabin that contains a human. Main Body 121 need not contain a human. FIG. 4 shows Main Body 121 containing Camera Device H2. In this case, Camera Device H2 is a heat source that generates heat in Main Body 121 while it captures images.

In this modification, an opening is provided in the side wall of Main Body 121. The opening covers a shooting area (angle of view) of Camera Device H2. Light-Transmitting Panel 1211 seals the opening. Camera Device H2 senses light entering through Light-Transmitting Panel 1211 and captures images.

In the example shown in FIG. 4, Main Body 121 other than the Light-Transmitting Panel 1211 is made of a material with high thermal conductivity, such as aluminum, and Main Body 121 serves as Heat Transfer Member 125 in the above-described embodiment. Accordingly, in this example, instead of a Heat Transfer Member 125, Container 12 has Heat Sink 129, which is made of a highly thermal conductive material such as aluminum and is in contact with each of Camera Device H2 and Main Body 121. In this example, Heat Sink 129 also serves as a platform for Camera Device H2.

In this example, some of heat generated by Camera Device H2 is transferred to Heat Absorber 124 via Heat Sink 129, Main Body 121, and Heat Absorber Holder 123, and is absorbed by Heat Absorber 124. as heat of vaporization.

At the same time, some of heat generated by Camera Device H2 in Main Body 121 is transferred to some of Air 122 in contact with Camera Device H2. Some of Air 122 heated by Camera Device H2 moves to a position in contact with Main Body 121 by, for example, convection. Then, some of heat of Air 122 is transferred to Heat Absorber Holder 123 through Main Body 121, and absorbed by Heat Absorber 124 as heat of vaporization.

Instead of or in addition to Camera Device H2, a type of device other than a camera device may be contained in Main Body 121.

Figure 5:
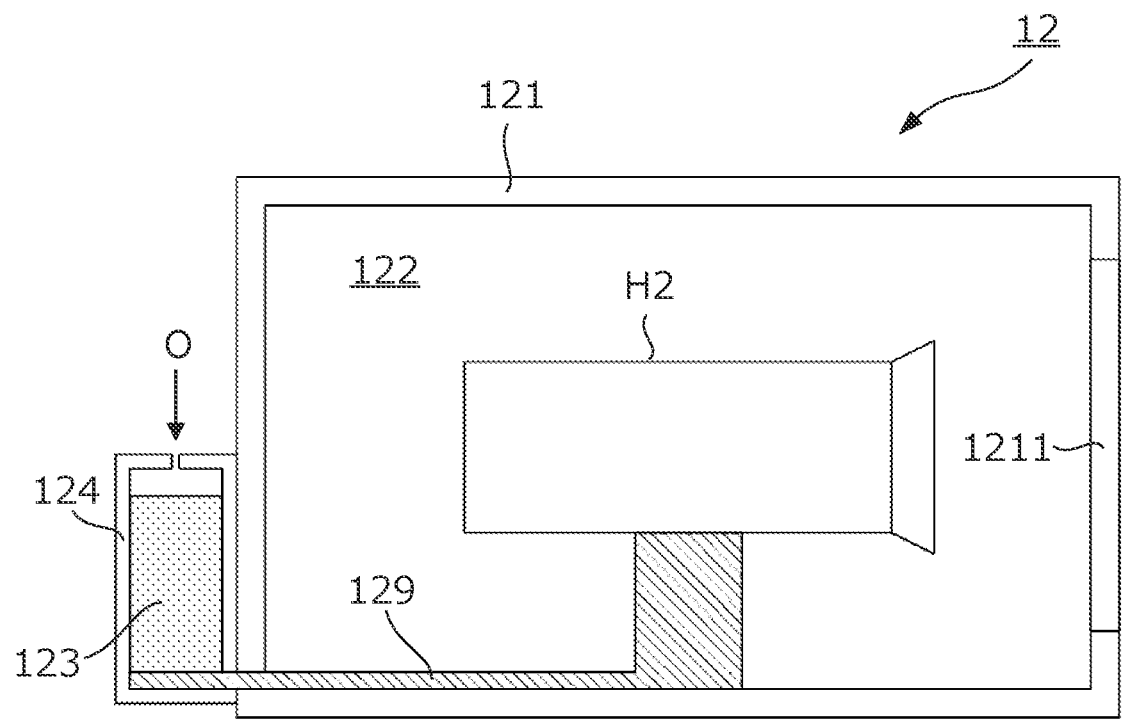
FIG. 5 shows a configuration of a container according to a modification of the exemplary embodiment of the present invention.

FIG. 5 shows Container 12 of another example of this modification. In the example shown in FIG. 5, Main Body 121 other than the Light-Transmitting Panel 1211 and Heat Absorber Holder 123 are made of a material that has a low thermal conductivity, such as a fiber-reinforced plastic.

Container 12 in this example is also equipped with Heat Sink 129 made of a heat conducting material that has a high thermal conductivity such as copper. Heat Sink 129 is arranged so that a part is in contact with Camera Device H2 and another part is in contact with Heat Absorber 124 via a hole that extends through Main Body 121. In this case, Heat Sink 129 is an example of a heat transfer member that transfers heat generated by Camera Device H2 as a heat source to Heat Absorber 124 without passing through Main Body 121.

Heat Absorber 124 may be made of a material that has a high thermal conductivity, such as aluminum, and a part of Heat Sink 129 may be in contact with Heat Absorber Holder 123 instead of Heat Absorber 124.

(3) In the above mentioned embodiment, Flying Object 1 is a gas balloon, but the type of Flying Object 1 is not limited to a gas balloon, and Flying Object 1 may be any other type of flying object such as a thermal balloon and an airship.

(4) In the above-described embodiment, Heat Absorber 124 is a liquid that becomes a gas when it absorbs heat while Flying Object 1 is in flight. Alternatively, Heat Absorber 124 may be a solid that becomes a liquid when it absorbs heat while Flying Object 1 is in flight. In that case, Heat Absorber 124 that has absorbed heat and changed from a solid to a liquid may absorb more heat of vaporization and change from a liquid to gas.

If Heat Absorber 124 absorbs heat to become liquid and then does not become gas, Heat Absorber Holder 123 may not be equipped with Opening O.

DESCRIPTION OF REFERENCE NUMERALS

1: Flying Object
11: Envelope
12: Container
13: Suspension Ropes 13
121: Main Body
122: Air
123: Heat Absorber Holder
124: Heat Absorber
125: Heat Transfer Member
126: Valve
127: Valve Controller
128: Thermometer
129: Heat Sink
1211: Light-Transmitting Panel

The invention claimed is:

1. A container for a flying object comprising:
a main body that contains a heat source and is kept airtight to maintain an interior air pressure;
a heat absorber that absorbs heat as a result of phase change of the heat absorber, the phase change being caused by a decrease in atmospheric pressure as the flying object ascends;
a heat absorber holder mounted to an outside of the main body the heat absorber holder holding the heat absorber under an atmospheric pressure outside of the main body; and
a heat transfer member that transfers heat generated by the heat source to the heat absorber, either by passing through the main body or without passing through the main body.

2. A container according to claim 1,
wherein the heat transfer member includes fluid that convects in the main body.

3. A container according to claim 1,
wherein the heat transfer member includes a heat transfer portion made of a heat transfer material, the heat transfer portion being in contact with the heat source, and in contact with the main body or the heat absorber holder.

4. A container according to claim 1,
wherein the heat absorber holder has an opening for exhausting the heat absorber when the heat absorber absorbs heat and transforms into a gas.

5. A container according to claim 4 comprising:
a valve that controls a flow of gas moving from an inside of the heat absorber holder to an outside of the heat absorber holder through the opening.

6. A container according to claim 5 comprising:
a thermometer that measures a temperature in the main body; and
a valve controller that controls opening and closing of the valve based on the temperature measured by the thermometer.

* * * * *